Nov. 28, 1933.     H. C. HEISER     1,937,341
ADJUSTABLE AWNING CENTER BEARING
Filed May 19, 1933
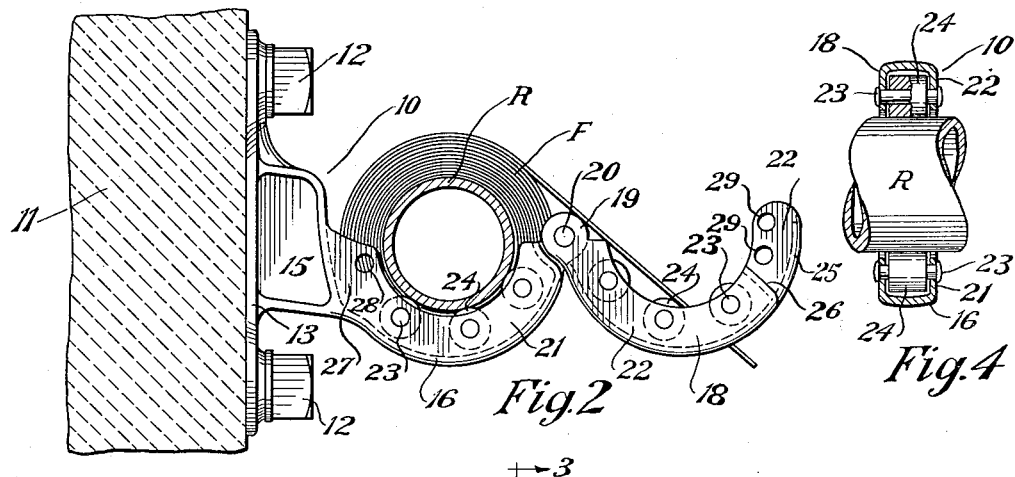
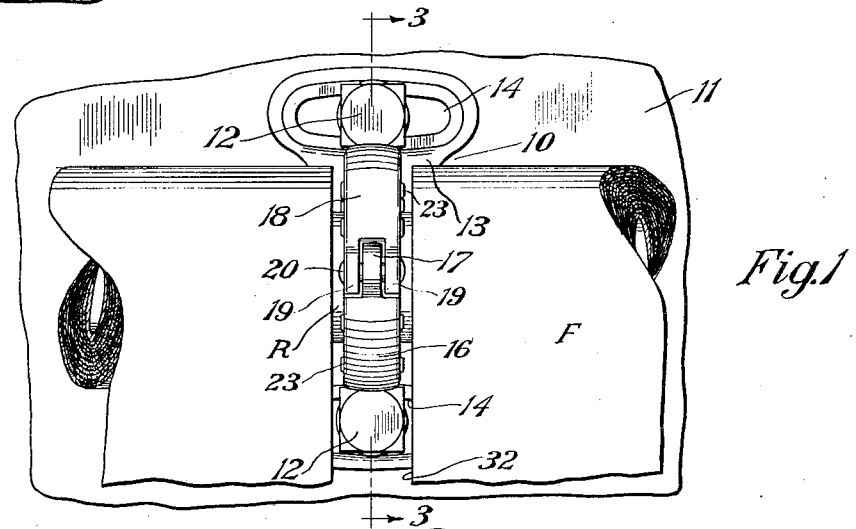
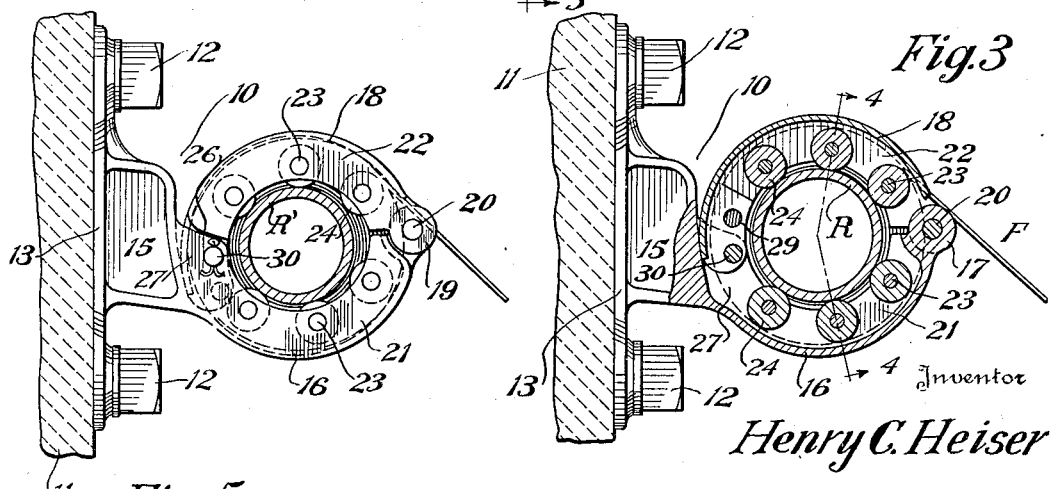
Inventor
Henry C. Heiser
By Frease and Bishop
Attorneys Patented Nov. 28, 1933

1,937,341

UNITED STATES PATENT OFFICE 1,937,341

ADJUSTABLE AWNING CENTER BEARING

Henry C. Heiser, Middleburg Heights, Ohio, assignor to The Astrup Company, Cleveland, Ohio, a corporation of Ohio Application May 19, 1933. Serial No. 671,868

6 Claims. (Cl. 156—44)

The invention relates to bearings for awning rollers, and more particularly to adjustable bearings for supporting an awning roller intermediate or centrally of its ends.

Prior intermediate or center bearing supports have included wooden rollers bearing on the outside of the rolled-up awning fabric, but the wooden rollers injure and tear the awning fabric as a result of continued wear as the fabric ages.

Other prior constructions have included the usual anti-friction ball or roller bearings fitting around the pipe or awning roller intermediate its ends, the awning fabric being slit or cut out to accommodate the bearings. With this type of construction, a different size bearing is required for every size of awning roller, and if it is desired to substitute this type for the wooden roller type bearing, it is necessary to take the awning fabric entirely off the roller and then insert the roller through the bearings.

With the latter prior construction, it is necessary to slide the intermediate or center bearings over the awning roller before mounting it in its end supports; so that in displacing the former prior type of center bearing with the latter prior type of center bearing, or in replacing the latter prior type of center bearing, the whole awning roll must be dismounted.

It is therefore an object of the present invention to provide an intermediate or center anti-friction bearing for an awning roller which will not injure the awning fabric.

Another object is to provide an anti-friction center bearing which is adjustable to accommodate various sizes of awning rollers.

A further object is to provide an anti-friction awning roller center bearing which may be applied to and removed from awnings already installed, without dismounting or dismantling the same.

Another object is to provide an anti-friction awning roller center bearing which may be mounted on a building or other support prior to the installation of the awning.

A still further object is to provide an anti-friction awning roller center bearing capable of lateral adjustment after being mounted, so as to provide for accurate alignment and to compensate for variable stretch in the awning fabric.

And finally, it is an object of the present invention to combine all of the foregoing advantageous features in a simple and economical structure, which is easily installed and replaced on various types and sizes of awnings.

These and other objects are attained by the improvements comprising the present invention, which may be stated in general terms as including a bracket having upper and lower bearing half portions hinged together at one of each of their ends, and being detachably and adjustably connected together at their other ends, rollers journalled in each of the bearing half portions and adapted for bearing on an awning roller, and the bracket being provided with enlarged slotted bolt holes for permitting lateral adjustment of the bearing on its support.

Referring to the accompanying drawing

Figure 1 is a front elevation of one of the improved adjustable anti-friction center bearings mounted on a support, with a portion of an awning having its roller positioned in said bearing;

Fig. 2 is a side elevation of the improved bearing bracket mounted on a support, showing the awning roller positioned in the lower bearing half portion with one end of the upper bearing half portion disconnected therefrom, to illustrate the manner of installing or replacing the bracket;

Fig. 3 is a sectional view taken substantially on the line 3—3, Fig. 1, portions of the bracket being shown in elevation;

Fig. 4 is a fragmentary sectional view, as on line 4—4, Fig. 3; and

Fig. 5 is a view similar to Fig. 3 of the improved bearing bracket having its bearing half portions selectively adjustably connected to fit a different size of awning roller.

Similar numerals refer to similar parts throughout the several views of the drawing.

The improved adjustable awning center bearing bracket is indicated generally at 10, and is secured to a building or other support 11, as by bolts 12.

The bracket 10 preferably has a vertically disposed base plate 13, provided with enlarged elongated or slotted apertures 14 at its upper and lower portions, through which the bolts 12 extend for clamping the bracket 10 to the support 11. By slightly loosening the bolts 12, the bracket may be adjusted laterally to the right or left, due to the elongation of apertures 14; or may be adjusted up and down, due to the enlargement of apertures 14.

Preferably, a supporting rib 15 projects outwardly from the base plate 13 at its central portion, and an outwardly extending, substantially semi-circular lower bearing half portion 16 is secured to or integral with said rib. The bearing half portion 16 is preferably provided at its outer end with a hinge ear 17. An upper, substantially semi-circular bearing half portion 18 is pivotally connected at its normally outer end to the lower half portion 16 by means of hinge ears 19 fitting over the hinge ears 17, there being registering apertures in the ears 17 and 19 through which a hinge pin 20 is inserted, and the projecting ends of the pin 20 may be swaged to prevent its removal.

The upper and lower bearing half portions 16 and 18 are substantially identical in cross section, being preferably U-shaped or channel shaped, as best shown in Fig. 4, and having side walls 21 and 22 respectively; and the bearing half portions 16 and 18 are horizontally separable as shown in Fig. 2.

A plurality of roller pintles 23 are mounted at intervals in the side walls 21 and 22 of the lower and upper bearing half portions 16 and 18 respectively, and an anti-friction roller 24 is journalled on each of the pintles for rotation between the side walls, each roller extending slightly inward radially of the side walls so as to bear upon an awning roller R positioned in the bearing half portions.

The ends of pintles 23 preferably extend beyond opposite side walls 21 and opposite side walls 22, and may be swaged to prevent their removal.

The normally inner end portion 25 of the upper bearing half 18, preferably has its side walls 22' inwardly offset from side walls 22, forming shoulders 26. When the bearing half portions are in closed position, as shown in Figs. 1, 3 and 4, the side walls 22' fit inside of the side walls 21 at the inner end 27 of the lower half portion 16. In this position, the shoulders 26 act as stops abutting the inner ends of side walls 21, as shown in Fig. 5.

Each side wall 21 at the inner end 27 of the lower bearing portion 16 is provided with an aperture 28, and the apertures 28 register with each other. The side walls 22' of the inner end 25 of upper bearing portion 18 are preferably provided with a series of apertures 29, two such apertures being shown in each side wall 22'.

Means for detachably and selectively adjustably connecting the bearing half portions 16 and 18 together to accommodate different sizes of awning rollers preferably includes a pin 30 which may be inserted through apertures 28 and any desired set of apertures 29 depending upon the size of the awning roller.

In Figs. 1 to 4 inclusive, the awning roller R is of relatively large size and the pin 30 is inserted through apertures 28 and the end set of apertures 29, so that the bearing half portions 16 and 18 are releasably connected together to form substantially a perfect circle bearing, with all of the rollers 24 rolling upon the awning roller R.

In Fig. 5, the pin 30 is inserted through apertures 28 and the inner set of apertures 29 so that the bearing half portions 16 and 18 are releasably connected together in adjusted position to accommodate the smaller awning roller R'. In this position, two of the rollers 24 do not bear upon the roller R', but the roller is engaged by a sufficient number of rollers for all practical purposes.

The rollers 24, the pintles 23, and other parts of the improved anti-friction awning center bearing 10, are preferably made of brass, bronze or the like so that they need not be constantly lubricated to obtain successful operation. However, the same may be made of other materials if desired.

In installing an awning utilizing the present improved adjustable anti-friction center bearings, the bearing brackets 10 may be first secured to the wall 11 in approximately the proper relative location, by means of the bolts 12. The awning is then mounted on the wall in its end supports in the usual manner, and by opening the bearing brackets 10, the awning roller R may be positioned therein, in the manner shown in Fig. 2; the awning fabric F having been previously slit, as at 32 to provide a slot sufficiently wide to accommodate the bearing half portions 16 and 18.

The upper half portion 18 is then closed, and its end 25 adjustably connected to the end 27 of portion 16 by inserting the pin 30 through holes 28 and the proper set of holes 29.

If the slots 32 do not exactly register with the bearings 10, which may occur as a result of the variable stretch of awning fabric, the bearings may be adjusted laterally on the wall 11, by loosening the bolts 12, as previously described. In the same manner, the bearings may be adjusted slightly up and down for alignment.

After the awning is properly installed, there is no wear upon the fabric F, because the rollers 24 roll upon the roller R without engaging the fabric. Moreover, the improved bearings may be used for different sizes of awning rollers, because of the selective adjustable connection between the bearing half portions 16 and 18.

The improved center bearings 10 may be applied to awnings already installed without dismounting said awnings, by virtue of the detachable adjustable connection between the bearing halves. Where the present bearings are to displace the old type having wooden rollers engaging the fabric, all that is necessary is to slot the awning fabric to accommodate the improved bearings, as shown at 32 in Fig. 1.

The improved bearing is light in weight, simple and economical to construct, and easily installed and/or replaced on various types and sizes of awnings.

I claim:

1. A center bearing for awning rollers including a bracket having a vertically disposed base plate and horizontally separable bearing portions releasably connected together, one of said bearing portions being carried by said bracket, anti-friction rollers journalled in said bearing portions, and means for adjustably securing the said bearing portions together whereby the bearing may support different sizes of awning rollers.

2. A center bearing for awning rollers including an upper bearing portion, a bracket having a vertically disposed base plate, a lower bearing portion carried by said bracket, means pivotally connecting one end of the upper portion to one end of the lower portion, rollers journalled in each of the bearing portions, and means for selectively adjustably connecting the other ends of said bearing portions together.

3. A center bearing for awning rollers including an upper bearing portion, a lower bearing portion, means pivotally connecting one end of the upper portion to one end of the lower portion, rollers journalled in each of the bearing portions for bearing on an intermediate portion of the awning roller, and means for detachably connecting the other ends of said bearing portions together.

4. Awning center bearing construction including a bearing bracket, a support, means for laterally adjustably connecting the bracket to the support, the bracket including bearing portions releasably connected together, anti-friction rollers journalled in said bearing portions, and means for adjustably securing the said bearing portions together, whereby the bearing may support different sizes of awning rollers.

5. Awning center bearing construction including a bearing bracket secured to a support, bolts for clamping the bracket to the support, the bracket including an upper bearing portion, a lower bearing portion, means pivotally connecting one end of the upper bearing portion to one end of the lower bearing portion, rollers journalled in each of the bearing portions, means for detachably connecting the other ends of the bearing portions together, and the bracket being provided with enlarged elongated holes through which the bolts extend.

6. Awning center bracket construction including a bearing bracket, a support, means for laterally adjustably connecting the bracket to the support, the bracket including an upper bearing portion, a lower bearing portion, means pivotally connecting one end of the upper bearing portion to one end of the lower bearing portion, rollers journalled in each of the bearing portions, and means for detachably connecting the other ends of the bearing portions together.

HENRY C. HEISER.